April 1, 1952     A. JENSEN     2,590,970
VEHICLE JACK
Filed Feb. 28, 1947
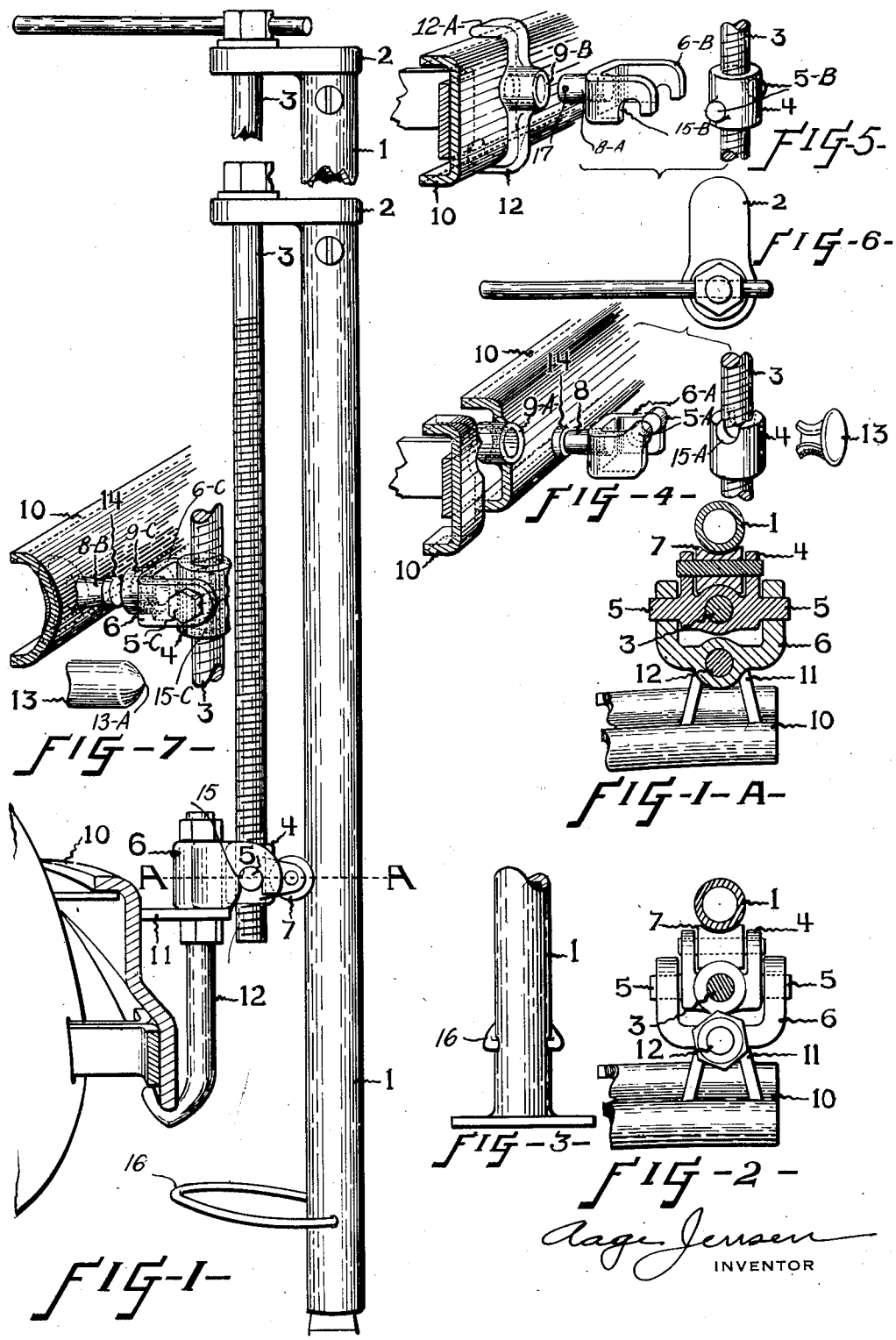

Patented Apr. 1, 1952

2,590,970

UNITED STATES PATENT OFFICE 2,590,970

VEHICLE JACK

Aage Jensen, Kenosha, Wis.

Application February 28, 1947, Serial No. 731,657

10 Claims. (Cl. 254—100)

My invention relates to improvements in vehicle jack.

One object is to promote operating ease; permitting the operator to stand erect, and to incorporate in the lifting mechanism means to reciprocate the shifting position of the lifting device when in use without incurring frictional resistance to the lifting device mechanism. Briefly; in combination, my improvements follow the principle, and the adaptability, of a universal joint to changeability of lift direction. Therefore, in the engaged combination, I have incorporated improvements in vehicle part construction and design, which will encourage proper use and placement for any type of lifting device using a provided vehicle part to lift with and against.

It is obvious that the trend in car design is to lower the gravitational center, by using still smaller diameter wheels; and consequently, fenders and other body parts will be altered to meet this trend. And in addition, weight reduction will figure prominently in specifications of vehicles in the immediate future. The technique of wheel removal now depends upon lifting the vehicle body to an unsprung relation with the wheel to be removed. Therefore, for these and other obvious reasons, which will follow in description, it is reasonable to anticipate that the vehicle bumper, or provided vehicle parts, will become the popular placement for any lifting device. And it also appears logical to assume that the manufacturers of vehicle bumpers, and vehicle parts, will provide means therein or thereon, or adjacently thereby, as set forth in this patent application, to facilitate proper setting of lifting devices by such provided means.

Another object of this invention is; to make possible the construction of lighter, better, and consequently, cheaper, lifting devices. Excessive bulk, and weight, in a vehicle lifting device is not necessary or desirable. Such bulk and weight are used in conventional bumper lifting devices only to compensate for excessive friction in the lifting mechanism, caused by faulty placement means of the load weight, on a lifting device.

A still further object of this invention is to facilitate safe operation of a lifting device using the vehicle bumper, or vehicle parts, by providing means on or within the bumper, or vehicle parts, which will maintain safe, yet flexible, connection with a vehicle lifting device.

While the drawings disclose only the jack screw and nut type of lifting device, it is of course, understood, that any type of lifting device, which has a load lifting member acting in the same lifting utility, as the aforesaid nut, is obviously anticipated herein as a lifting device to which this invention applies itself. Therefore, an outstanding feature of this invention consists, generally, of the novel connective means between a vehicle part and a vehicle lifting device, and their relation one to the other.

With reference to the drawings: Figure 1 is a view in side elevation of a jack-screw jack in position againt a vehicle bumper. Figure 1-A is a cross sectional view along the dotted line A—A as denoted in Figure 1. Figure 2 is a view in cross section slightly above the dotted line A—A, disclosing, in top plan relief, the load lifting member. Figure 3 is a view in front elevation of the lower portion of the lifting standard, and, applies only to Figure 1. Figure 4 is a view in perspective of a vehicle bumper or vehicle part; a lifting device, showing, in assembly projection, the relationship of the various novel parts which provide universal alignment with the load direction thrust. Figure 5 is like-wise a view in perspective of an assembly projection denoting a bumper hook conforming to the bumper form, or outline. And, Figures 4 and 5, collectively, illustrate the interchangeability of parts and design, in several novel parts thereof, without departing from the merits, or initial purpose, of either. Figure 6 is a top plan view of the jack head substantially as in Figure 1. Figure 7 imparts further elaboration, in perspective projection, of a reversal in parts adaptability when compared with Figures 4 and 5.

With further reference to the drawings in numerical detail: 1 is an upright standard, supporting, uppermostly, an overextending standard head 2; which will be better understood as a bracket. And, said head 2 having bearing means therein to contain, loosely, a headed screw 3, extending downward, parallel with the upright standard 1; and, engaging the screw 3 a load lifting nut 4, thereon, and on the body of the said lifting nut 4 pivotal bearing means stub shafts 5, to engage with receptive female bearing means 15, as in Figure 1, in the U-shaped member 6; said U-shaped member 6 being pivotally suspended from the stub shafts 5.

In the various figures, respectively, 4, 5, and 7, pivotal bearing means identical in function to male part 5 and female part 15 will appear, in description as 5–A and 15–A, 5–B and 15–B, 5–C and 15–C: And likewise, the U-shaped member 6 hereinafter referred to as yoke part 6 appears in modified form in Figs. 4, 5 and 7 as yoke part member 6-A now having a stub shaft projection 8, from the base of the yoke 6, and a collar 14, on said stub shaft 8 projection; and again, a yoke part member 6B having a plain stub shaft projection 8-A, projecting, from the base of said yoke part, and further, a yoke part member 6C having a socket portion 9, projecting from the base thereof. On the body of the load lifting member 4 means are provided to support a roller 7 with a face formed to engage the upright standard 1. From the base portion of a U-shaped yoke part 6 provisions are made to carry a generally J-shaped load engaging hook 12, having bracing means 11, co-operating therewith. More broadly, in anticipation of future trends, the base projection 8, or base projection 8-A, or base projection 9, respectfully, in Figures 4, 5, and 7, project from the U-shaped yoke member 6-A, to 6-C, inclusive, instead of the J-shaped hook 12, and bracing means 11.

The numeral 10, is essentially, a vehicle part having socket means 9-A, therein, to engage, pivotally, a stub shaft member 8, from the yoke part 6-A, as in Figure 4; and on said stub shaft member 8, a collar 14, retains said pivotal engagement, against end thrust, by dropping in back of the remote edge of socket means 9-A.

And in Figure 7, where engagement means are reversed, said collar 14, on stub shaft 8-B, projecting from the vehicle part 10, drops in back of the foremost edge of socket means 9, which is a base projection from the yoke part 6-C. And thus, in like description, relative to Figure 5, a stub shaft projection 8-A from the yoke member 6-B, engages socket means 9-B in a bumper engaging hook 12-A. And said hook 12-A has a body conforming to the vehicle bumper 10, shape, and as a means to retain engagement, between said stub shaft 8-A and said socket means 9-B, a hole 17, is provided in the stub shaft 8-A, through which a pin may be inserted. Of course, it is anticipated that a collar 14 would do as well as the pin 17, on the free end of said stub shaft 8-A.

And, for the purpose of concealing in non-use, socket means 9-A in vehicle part 10, a shield 13, having a self-retaining spring means with said part 9-A, is provided. A shield 13-A, likewise is used to conceal a vehicle part stub shaft projection 8-B, on the bumper 10.

A loop member 16, hinging to the standard 1, is provided to engage the bumper hook 12 when said jack is not operating, thus preventing disjointing at bearing means 5, and 15. However, it is anticipated that notched bearing means 15, and correlative stub shaft bearing means 5, could be substituted by solid female bearing means 15-C and stub shaft correlative bearing means 5-C, thereby eliminating the use of said loop 16.

Again referring to bumper hook 12-A. It is obvious that socket means 9-B, therein, could be interchanged with stub shaft means 8, in the yoke part 6-B, without departing from the merits of this invention; Thus, in view of the foregoing interchangeability of parts adaptation, and description preceding the same, it is plainly evident that interchangeability of parts, between the various figures in the drawings is anticipated. Therefore, I do not wish to limit myself, in strict compliance, with the drawings and the design of parts therein illustrated.

Having thus described my invention what I claim is:

1. In a jack, a base, a standard mounted on said base, a bracket fixed to the upper ends of the standard and extending laterally therefrom, a jack screw journaled in said bracket for rotation therein, means to turn said jack screw, a load lifting nut threadably engaged by said jack screw, a roller mounted on one side of said nut for rolling engagement with said standard, a U-shaped yoke pivoted to said nut and having means thereon for engagement with the bumper of an automobile.

2. The structure of claim 1 wherein said last named means comprises a stub shaft projecting from the base of the U-shaped yoke, said stub shaft projecting in a direction opposite to the arms of the yoke, and adapted to be engaged with an opening in a bumper of a vehicle.

3. The structure of claim 2 and a locking collar on the outer end of the stub shaft, said locking collar being adapted to retain said yoke in engaging position by hooking behind the remote edge of the opening.

4. The structure of claim 1 wherein said last named means comprises a socket in the base of the U-shaped yoke having an opening therein, said opening being adapted to receive a projection mounted on a vehicle bumper.

5. The structure of claim 1 wherein said last named means comprises a J-shaped load engaging hook fixed to the base of the yoke in a plane normal to the arms thereof.

6. The structure of claim 5 and a brace extending from the yoke in a direction opposite to the arms thereof and above the lower end of the hook, said brace being adapted to contact the bumper and maintain it in spaced relation to the jack.

7. In combination, a standard, a load lifting member, means to raise and lower the load lifting member relative to the standard, a U-shaped yoke pivoted to said load lifting member, a vehicle having a part to be lifted, and engagement means between said yoke and said part, and said engagement means comprising a socket in the base of said yoke and a stub shaft projecting laterally from said part.

8. In combination, a standard, a load lifting member, means to raise and lower the load lifting member relative to the standard, a U-shaped yoke pivoted to said load lifting member, a vehicle having a part to be lifted, and engagement means between said yoke and said part, and wherein said engagement means comprises a stub shaft projecting from the base of said yoke, said stub shaft having a collar on the end remote from the yoke, and a socket in said part to receive said shaft.

9. In combination, a standard, a load lifting member, means to raise and lower the load lifting member relative to the standard, a U-shaped yoke pivoted to said load lifting member, a vehicle having a part to be lifted, and engagement means between said yoke and said part, and wherein said engagement means comprises a stub shaft projecting from the base of said yoke, a bracket on said part, said bracket having a socket in a face thereof to receive said shaft.

10. In combination, a standard, a load lifting member, means to raise and lower the load lifting member relative to the standard, a U-shaped yoke pivoted to said load lifting member, a vehicle having a part to be lifted, and engagement means between said yoke and said part, and wherein said engagement means comprises a socket in the base of said yoke, a bracket on said part, said bracket having a stub shaft thereon to be received into said socket.

AAGE JENSEN.

REFERENCES CITED

The following references are of record in the file of this patent:

UNITED STATES PATENTS

| Number | Name | Date |
|---|---|---|
| 1,101,598 | Weinke | June 30, 1914 |
| 1,795,391 | Hansen | Mar. 10, 1931 |
| 1,828,913 | Toomey et al. | Oct. 27, 1931 |
| 2,028,905 | Hein | Jan. 28, 1936 |
| 2,149,248 | Haferkorn | Feb. 28, 1939 |
| 2,164,621 | Pfauser | July 4, 1939 |

FOREIGN PATENTS

| Number | Country | Date |
|---|---|---|
| 476,625 | Great Britain | Dec. 8, 1937 |
| 791,725 | France | Dec. 16, 1935 |